United States Patent
Guryevskiy

(10) Patent No.: US 7,552,845 B2
(45) Date of Patent: Jun. 30, 2009

(54) FINE PARTICLE DISPENSING APPARATUS AND METHOD

(76) Inventor: Natan Guryevskiy, 1608 E. 22nd St., 2nd Floor, Brooklyn, NY (US) 11210

( * ) Notice: Subject to any disclaimer, the term of this patent is extended or adjusted under 35 U.S.C. 154(b) by 565 days.

(21) Appl. No.: 11/115,560

(22) Filed: Apr. 27, 2005

(65) Prior Publication Data

US 2005/0274748 A1   Dec. 15, 2005

Related U.S. Application Data

(60) Provisional application No. 60/575,857, filed on Jun. 1, 2004.

(51) Int. Cl.
*B65D 83/00* (2006.01)
(52) U.S. Cl. .......................... 222/86; 222/82; 222/83.5; 222/88; 222/89; 222/93; 222/105; 222/183; 222/185.1; 222/195; 222/630; 222/94; 141/65; 141/67; 141/114; 141/330
(58) Field of Classification Search .................... 222/1, 222/81, 82, 85–89, 183, 185.1, 630, 83, 83.5, 222/93, 481.5, 94, 105, 195; 141/65, 67, 141/330, 114, 329; 414/412
See application file for complete search history.

(56) References Cited

U.S. PATENT DOCUMENTS

| | | | | |
|---|---|---|---|---|
| 1,406,904 A * | 2/1922 | Rose | | 222/82 |
| 3,159,311 A * | 12/1964 | Fowler | | 222/82 |
| 3,926,339 A * | 12/1975 | Openchowski | | 222/83 |
| 4,256,241 A * | 3/1981 | Mesic | | 222/85 |
| 4,421,249 A * | 12/1983 | Williamson et al. | | 222/88 |
| 4,961,440 A * | 10/1990 | Wright | | 134/167 R |
| 4,998,850 A * | 3/1991 | Crowell | | 406/48 |
| 5,445,192 A * | 8/1995 | Hansen | | 141/2 |
| 5,474,111 A | 12/1995 | Williamson et al. | | |
| 5,683,361 A * | 11/1997 | Elk et al. | | 604/58 |
| 5,746,347 A | 5/1998 | Riedemann et al. | | |
| 5,971,207 A | 10/1999 | McDonough et al. | | |
| 6,050,750 A | 4/2000 | Aoki | | |
| 6,892,909 B1 * | 5/2005 | Hebert et al. | | 222/637 |
| 7,168,459 B2 * | 1/2007 | Bibbo et al. | | 141/5 |
| 2004/0055470 A1 | 3/2004 | Strauser et al. | | |

FOREIGN PATENT DOCUMENTS

JP     2000344346     12/2000

* cited by examiner

*Primary Examiner*—J. Casimer Jacyna
(74) *Attorney, Agent, or Firm*—James Ray & Assoc.

(57) ABSTRACT

An apparatus for dispensing fine particulate matter from a flexible container includes a housing with a first open end and an opposed closed end. A nozzle is attached to the closed end extending into the housing. The nozzle has a passageway extending therethrough and a first end puncturing a wall of the container and enabling the first member to penetrate the container. A pump member is disposed transversely to the nozzle and includes a passageway having a venturi and a venturi throat disposed adjacent a first end. The second end receives a supply of fluid under pressure. A vent is attached to the cover and has one end puncturing and penetrating the wall of the container. Supply of fluid under pressure forms a pressure differential between opposite ends of the container and enables the fine particulate matter to enter the first and second passage for mixing with the fluid.

10 Claims, 2 Drawing Sheets

FINE PARTICLE DISPENSING APPARATUS AND METHOD

CROSS-REFERENCE TO RELATED APPLICATIONS

Figure 1:
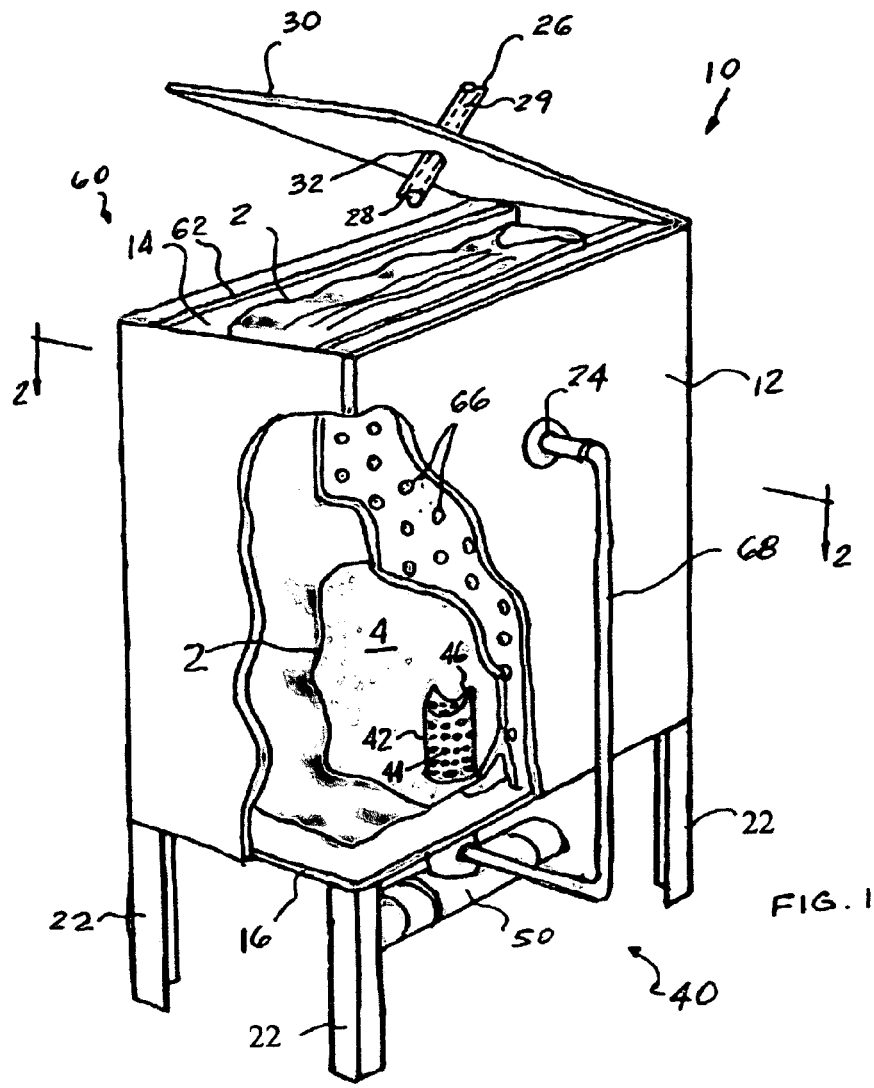

This application is related to and claims priority from U.S. Provisional Patent Application Ser. No. 60/575,857 filed on Jun. 1, 2004.

FIELD OF THE INVENTION

The present invention relates, in general, to an apparatus for dispensing fine dry particulate matter from a container and, more particularly, this invention relates to an apparatus for a dust and pollution free dispensing of fine dry particulate matter from a flexible container such as bag and the like.

BACKGROUND OF THE INVENTION

As is generally well known a wide variety of industries, such as food processing, pharmaceutical, chemical, waste water treatment and the like, utilize powdery materials consisting of fine dry particles as a main input ingredient in the manufacturing process. Such materials are transported in bulk form, as such transportation method has been proven to be the most economical, and are generally transferred into flexible containers such as bags for dispensing into various manufacturing machinery.

It is further well known that handling of such flexible containers require extreme care so as not to promulgate dust and pollution in the working environment, particularly when the material may be toxic in its nature. Therefore, the presently used material handling methods employ additional air-clean equipment such as auxiliary hoppers, cyclones, fans, filters, screw feeders and the like for providing dust and pollution free environment which is undesirable because of the increased process and product costs associated with cost and maintenance of such additional equipment and increased energy consumption to run it.

Therefore, there is a need for an improved apparatus for a dust and pollution free dispensing of the fine dry particulate matter in a cost effective manner.

SUMMARY OF THE INVENTION

The invention provides an apparatus for dispensing fine particulate matter from a container. The apparatus includes a housing with a first open end and an opposed closed end. A cover is pivotally attached to an open end for selectively opening and closing thereof. A nozzle is attached to the closed end and has a first member at least partially extending into the housing. There is a first passageway provided in the first member of the nozzle. The first end of the first member is capable of puncturing a wall of the container and enabling the first member to penetrate the container. The first member is adapted with a plurality of apertures disposed adjacent the first end. A second member with a second passageway is disposed transversely to the first member at a second end thereof. The second passageway communicates with the first passageway and is formed to include a venturi and a venturi throat disposed adjacent a first end of the second member. The second end of the second member receives a supply of fluid under pressure. A vent in a form of an elongated member with a passageway is attached to the cover and has one end adapted for puncturing and penetrating the wall of the container. Supply of fluid under pressure forms a pressure differential between opposite ends of the container and enables the fine particulate matter to enter the first passage and then the second passage for mixing with the fluid and such mixture is being transported to a point of use.

At least one perforated partition is installed within the housing intermediate an inner surface thereof and the outer surface of the container and the housing and the first member of the nozzle are connected with an elongated member with a passageway communicating with the cavity of the housing and the first passageway of the first member of the nozzle. During operation, supply of fluid under pressure forms a vacuum condition within the housing and forces at least a portion of the container surface to abut the at least one perforated partition significantly increasing the amount of fine particulate matter being dispensed.

OBJECTS OF THE INVENTION

It is, therefore, one of the primary objects of the present invention to provide an apparatus for dispensing fine particulate matter from a storage container.

Another object of the present invention is to provide an apparatus for dispensing fine particulate matter that facilitates dust free and pollution free environment.

Yet another object of the present invention is to provide an apparatus for dispensing fine particulate matter that eliminates the need for auxiliary air-clean equipment.

A further object of the present invention is to provide an apparatus for dispensing fine particulate matter that accommodates use of flexible storage containers of various sizes.

Yet a further object of the present invention is to provide an apparatus for dispensing fine particulate matter that is easy to install and operate.

An additional object of the present invention is to provide an apparatus for dispensing fine particulate matter that is more reliable and is easy to maintain.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a perspective view, partially in a cut-out, of a fine particle dispensing apparatus of the present invention;

FIG. 2 is a partial cross-section view along lines 2-2 of FIG. 1; and FIG. 3 is a schematic diagram representing application of the fine particle dispensing apparatus of the present invention particularly showing.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-3, wherein there is shown an apparatus, generally designated 10, for dispensing fine particulate matter 4 from a container 2, which is preferably a flexible container such as bag or a sack. The apparatus 10 includes a hollow housing 12 having a predetermined shape and a predetermined size and having a first open end 14 and a second, preferably, closed end 16 forming a cavity 15 for receiving the container 2. The preferred predetermined shape of the housing 12 is a rectangle. The housing 12 may be also adapted with at least one baffle member 20 angularly attached to sides of the housing 12 and the closed end 16 for directing the lower end of the container 2 toward the center of the second closed end 16.

In further reference to FIG. 1, the apparatus 10 of the present invention may be further provided with means for engagement with or attachment to a rigid surface or structure which, in the preferred embodiment, is a plurality of leg member 22 attached to the housing 12 and extending beyond the closed end 16 in a manner enabling upright orientation of the housing 12 with an open end 14 disposed upwardly.

Means 26 engages the first open end 14 and contains a first end 28 having a first predetermined profile and capable of puncturing and penetrating an upper wall portion of the container 2 so that means 26 can be at least partially inserted into an upper portion of the container 2. The means 26 is provided with an internal passageway 29 for communicating the upper portion of the container 2 to atmosphere. The first predetermined profile of the first end 28 may include but not limited to a bevel cut, slant cut, conical cut, triangle cut or any combination thereof.

When required, the means 26 is rigidly attached to a cover means 30 adapted for selectively opening and closing the first open end 14 of the housing 12. In such embodiment, the means 26 extends through an aperture 32 of the cover means 30. Preferably, the cover means 30 is pivotally secured to a predetermined portion of the housing 12. In applications using various sizes of the container 2, the means 26 may be adjustably secured to the cover means 30 and movable within the aperture 32 to accommodate various sizes of the container 2 and puncture the upper surface thereof.

A gasket means (not shown) attached to one of the cover means 30, the open end 14 of the housing 12 and a combination thereof may be provided for additionally sealing such engagement of the cover means 30 with the open end 14.

Figure 2:
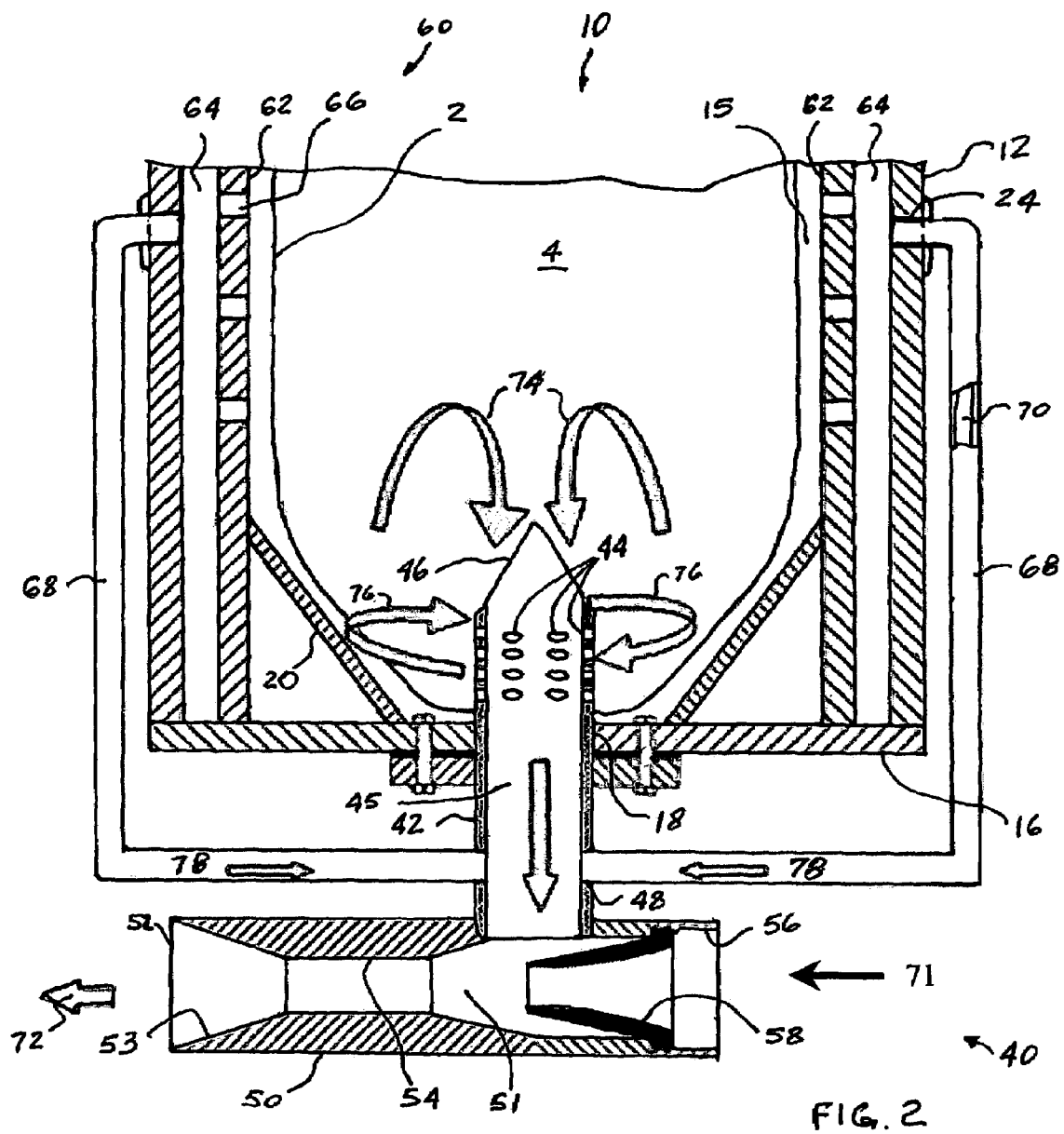

Now in particular reference to FIG. 2, there is shown means, generally designated 40, engageable with the lower portion of the container 2 for dispensing the fine particulate matter 4 therefrom. Means 40 includes a first elongated member 42 having a predetermined plurality of first apertures 44 arranged in a first predetermined pattern and disposed within the first elongated member 40 adjacent a first end 46 which has a second predetermined profile capable of puncturing and penetrating a lower wall portion of the container 2 enabling at least partial insertion of such first elongated member 40 into the lower portion of the container 2. The second predetermined profile of the first end 46 may include but not limited to a bevel cut, slant cut, conical cut, triangle cut or any combination thereof. The first elongated member 40 is provided with internal passageway 45 enabling passage of the fine particulate matter 4 therethrough. Preferably, the first elongated member 42 is removably attached to the closed end 16 of the housing 12 and at least partially extending into the cavity 15 through an aperture 18 provided in the closed end 16.

In the preferred embodiment of the present invention, the opposite end of the first elongated member 40 is rigidly connected to a second elongated member 50 intermediate ends thereof. The second elongated member 50 has an internal passageway 51 in communication with the internal passageway 45 of the first elongated member 40 enabling further passage of the fine particulate matter 4. The internal passageway 51 has a Venturi 53 disposed adjacent a first end 52 thereof. A Venturi throat portion 54 of a predetermined size is disposed intermediate the Venturi 53 and the second end of the first hollow member 42. The opposite end 56 of the second elongated member 50 is provided with a cone-shaped jet 58.

It is further preferred that such first elongated member 42 is integral to such second elongated member 50 and at least partially produced by a casting process to provide for manufacturing cost economies.

Figure 3:
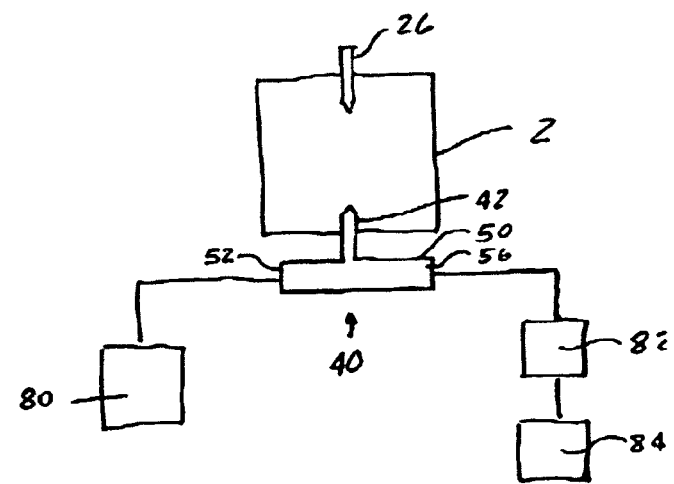

In a particular reference to FIG. 3, the first end 52 is adapted for connection to a load 80 which may be a storage tank, an intermediate dissolving tank or a process equipment. The second end 56 is adapted for connection to a fluid source 84 for receiving a supply of a fluid 71. The fluid 71 may be one of a liquid and a gaseous matter. A pump means 82 providing supply of the fluid 71 may be disposed intermediate the fluid source 84 and the second end 56 as shown in FIG. 3 for forcing the fluid 71 into the second elongated member 50 or may be disposed intermediate the load 80 and the first end 52 for suctioning the fluid 71 from the second elongated member 50.

In operation, means 26 is operable to puncture and penetrate the upper portion of the container 2 and the first elongated member 42 is operable to puncture and penetrate the lower portion of the container 2.

Activation of the pump means 82 generates flow of the fluid 71 under pressure from the fluid source 84 into the cone shaped jet 58 of the second elongated member 50. Further flow of the fluid 50 through Venturi 52 and Venturi throat 54 increases the speed of the fluid 71 causing a pressure drop thereof and forming a pressure differential between interior of the container 2 and the atmosphere. Such pressure differential forces the fine particulate matter 4 to first enter the passageway 45 in a first direction 74 through the first open end 46 and in a second direction 76 through the first predetermined plurality of apertures 44 and then enter the passageway 51 mixing with the fluid 71 with such mixture being transported in either suspension or solution through the Venturi 52 to the load 80 in a direction 72.

It will be apparent to those skilled in the art that such operation provides for dust free and pollution free dispensing of the fine particulate matter 4 from the container 2. Furthermore, such apparatus 10 does not contain any moving elements and eliminates, particularly in combination with the fluid 70 being a predetermined liquid, a need for auxiliary air-clean equipment.

It will be appreciated that when the housing 12 is provided, the container 2 is placed inside the cavity 15 engaging the first end 46 of the first elongated member 40 and causing such first end 46 to puncture the lower portion of the container 2. Next, the cover means 30 is pivoted to close the open end 14 causing the end 28 of the means 26 to puncture the upper portion of such container 2 and vent its interior to atmosphere.

In applications utilizing the flexible container 2 and mandating significant dispensing of the fine particulate matter 4, the apparatus 10 may be further provided with means, generally designated 60, rigidly disposed within the housing 12. In a preferred embodiment, such means 60 include at least one member 62 disposed intermediate the outer surface of the container 2 and the inner surface of the housing 12 at a predetermined distance 64 therefrom. The at least one member 62 is provided with a predetermined plurality of second apertures 66 disposed in a second predetermined pattern. The at least one means 68 with an internal passageway 70 has a first open end rigidly connected to a predetermined side surface portion of the housing 12 and has a second end rigidly connected to the first elongated member 40 enabling the internal passageway 70 to communicate with the cavity 15 through an aperture 24 of the housing 12 which is disposed adjacent the member 62 and communicate with the internal passageway 45 of the first elongated member 42 through an aperture 48 thereof which is disposed adjacent the second elongated member 50 externally to the closed end 16 of the housing 12.

In operation, activation of the pump means 82 causes the air in the cavity 15 to flow first through the predetermined plurality of second apertures 66 and then through the passageway 70 in a direction 78 into the passageway 45 of the first elongated member 40 creating vacuum inside the cavity 15 and forcing the outer surface of the flexible container 2 to abut a surface of the at least one member 62, thus retaining a predetermined shape of such container 2.

Although the present invention has been shown in terms of the housing 12 having a rectangular shape and in terms of the member 62 shown as a pair of members 62 disposed adjacent opposite sides of such rectangular shaped housing 12, it will be apparent to those skilled in the art, that the present invention may be applied to other shapes of the housing 12 with members 62 disposed in a predetermined arrangement to enable abutment with surface of the flexible container 2. For example, such member 62 may be formed as an enclosure identical in shape to and smaller in size than the housing 12 and further incorporating the baffle members 20. Such construction will be particularly advantageous when the predetermined shape of the housing 12 is round.

Furthermore, it will be apparent to those skilled in the art that an existing housing, and further in combination with a cover, may be easily retrofitted with the fine particle dispensing apparatus of the present invention by attaching means 26 to such cover, attaching at least first elongated member 42 to the closed end of the existing housing and at least connecting such first elongated member 42 to a source of fluid pressure enabling dispensing of the fine particulate matter 4.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus for dispensing a fine particulate matter from a container, said apparatus comprising:

(a) a vent means having a first end thereof operatively penetrating a first end of said container and connecting said first end of said container directly to unpressurized atmosphere;

(b) a fine particulate transport means engageable with a second end of said container for enabling evacuation of said fine particulate matter therefrom;

(c) a housing having each of a predetermined shape and a predetermined size, said housing having a first open end and an axially opposed second end being one of open and closed, said first end and said second end forming a cavity for receiving said container, whereby said vent means is disposed within said first end of said housing and said fine particulate transport means is engageable with said second end of said housing; and a means for retaining a predetermined shape of said container during dispensing of said fine particulate matter that includes;

(d) at least one member disposed within said cavity of said housing intermediate an outer surface of said container and an inner surface of said housing at a predetermined distance therefrom;

(e) a predetermined plurality of apertures disposed in a predetermined pattern within said at least one member;

(f) an elongated member spaced from an exterior side surface of said housing, said elongated member having one end thereof attached to said exterior side surface of said housing adjacent a side surface of said at least one member and an opposed end thereof attached to said fine particulate transport means external each of said container and said housing; and (g) a passage way disposed within said elongated member and communicating with said cavity of said housing and said fine particulate transport means.

2. The apparatus, according to claim 1, wherein said vent means includes a passage way disposed therein and wherein said first end of said vent means has a first predetermined profile.

3. The apparatus, according to claim 2, wherein said first predetermined profile of said first end of said vent means is one of a bevel cut, slant cut, conical cut, triangle cut and various combinations thereof, said predetermined profile capable of puncturing a wall of said container.

4. The apparatus, according to claim 2, wherein said fine particulate transport means includes a passage way disposed therein and a first end having a second predetermined profile, said first end at least partially penetrating said second end of said container.

5. The apparatus, according to claim 4, wherein said fine particulate transport means further includes a second end axially opposed to said first end, said second end having a connection with a suction source, whereby activation of said suction source provides a pressure differential between said first end and said second end of said container causing said fine particulate matter to enter said transport means passage way through said first end and exit said transport means passage way through said second end of said fine particulate transport means for dispensing said fine particulate matter from said container and transporting said fine particulate matter to a point of use.

6. The apparatus, according to claim 5, wherein said apparatus further includes a pump means disposed integral and transverse to said fine particulate transport means, whereby a second end of said fine particulate transport means is disposed intermediate a first end and a second end of said pump means, said pump means having a passage way connected to said transport means passage way, a venturi disposed at said first end of said pump means, a venturi throat disposed intermediate said venturi and said transport means passage way and said second end of said pump means is adapted to receive a fluid under pressure, whereby supply of said fluid under pressure draws said fine particulate matter first into said transport means passage way and then into said pump means passage way, said fine particulate matter forms a mixture with said fluid in said pump means passage way and said mixture is transported through said first end of said pump means to said point of use.

7. The apparatus, according to claim 4, wherein said fine particulate transport means includes a predetermined plurality of first apertures disposed in a predetermined pattern adjacent said first end thereof for receiving said fine particulate matter and enabling entry thereof into said transport means passage way.

8. The apparatus, according to claim 1, wherein said apparatus further includes a cover pivotally connected to a predetermined portion of said housing adjacent said first open end for selectively closing and opening thereof, said vent means is one of rigidly and adjustably attached to said cover and extending into said cavity of said housing through an aperture in said cover, whereby closing of said cover causes said vent means to at least partially penetrate said container.

9. The apparatus, according to claim 8, wherein said apparatus further includes a gasket means attached to one of said cover, said first open end of said housing and a combination thereof for sealing engagement of said cover with said first open end.

10. The apparatus, according to claim 1, wherein said housing further includes means connected thereto for attachment to or placement onto a rigid structure.

* * * * *